United States Patent [19]

Lawlor

[11] 4,040,037
[45] Aug. 2, 1977

[54] BUFFER CHAINING
[75] Inventor: Francis D. Lawlor, Hyde Park, N.Y.
[73] Assignee: International Business Machines Corporation, Armonk, N.Y.
[21] Appl. No.: 691,953
[22] Filed: June 1, 1976
[51] Int. Cl.[2] .............................................. G06F 3/00
[52] U.S. Cl. .................................................... 364/200
[58] Field of Search ................................... 340/172.5
[56] References Cited
U.S. PATENT DOCUMENTS

| 3,488,633 | 1/1970 | King et al. | 340/172.5 |
| 3,688,274 | 8/1972 | Cormier et al. | 340/172.5 |
| 3,725,864 | 4/1973 | Clark et al. | 340/172.5 |
| 3,728,693 | 4/1973 | Macker et al. | 340/172.5 |

Primary Examiner—Raulfe B. Zache
Attorney, Agent, or Firm—Robert Lieber

[57] ABSTRACT

In a data processing system allocation of excessive main/working storage space to sequential input records (input blocks) of indeterminate length frequently results in wasteful fragmentation. This is avoided by the present invention. An input-output channel of conventional construction is modified so that in chaining mode it (the channel) can operate optionally to: (1) transfer sequential input data blocks of unspecified length into contiguous positions in main storage, and (2) without CPU interruption/intervention store delimiting information, in storage locations containing Channel Command Words (CCW's) designating respective transfers, which effectively distinguishes storage boundaries between adjacent blocks. The storage of delimiting information effectively relieves the control and application programs of the central system of responsibility for analyzing the information context of the data in each block for "possibly obscure" delimiting intelligence. The foregoing routing and delimiting operations may be made entirely transparent to the peripheral attachment interface of the channel so that peripheral attachment is not complicated.

24 Claims, 7 Drawing Figures

LENGTH DETERMINATIONS:

1. RETRIEVE CSW, CCW3, CCW2, CCW1.
2. DA/CCW2−DA/CCW1=LENGTH/DATA SUBSET 1=1029−1000=29
3. DA/CCW3−DA/CCW3=LENGTH/DATA SUBSET 2=1079−1029=50
4. SUM=50 + 29 =79
5. CT/CCW1− RESID. CT/CSW−SUM=LENGTH/DATA SUBSET 3=100−6−79=15

FIG. 6

| CCW | CC (BIT 33) | BC (BIT 45) | INTERNAL DATA ADDRESS |
|---|---|---|---|
| 1 | 1 | 1 | BITS 8-31 |
| 2 | 1 | 1 | SAVED |
| 3 | 1 | 0 | SAVED |
| 4 | 1 | 1 | BITS 8-31 |
| 5 | 1 | 1 | SAVED |
| 6 | 1 | 0 | SAVED |
| 7 | 1 | 1 | BIT 8-31 |
| ⋮ | ⋮ | ⋮ | ⋮ |

NOTE: TIC COMMAND MAY NOT FOLLOW A CCW HAVING A BUFFER CHAIN FLAG BIT=1

FIG. 7

BUFFER CHAINING

BACKGROUND OF THE INVENTION

1. Field of the Invention

My invention pertains to utilization of main storage in data processing systems, and particularly to avoidance of wasteful fragmentation due to allocation of excessive storage space to sequential (chained) input channeling operations of indefinite/unspecified length. One aspect of my invention pertains to a method and apparatus for operating otherwise conventional input-output channels to route data of indefinite length in successive (chained) input operations into contiguous positions in main storage with minimal interaction between the channel and control programs of the central (host CPU) system and without altering peripheral attachments.

2. Prior Art

Orderly inventorying and utilization of "scattered" (non-contiguous) areas in computer main storage is treated at length in U.S. Pat. Nos. 2,968,027 by J. A. McDonnell et al, entitled "Data Processing System Memory Controls" and 3,241,125 by R. M. Tomasulo et al, entitled "Memory Allocation".

An article by R. J. Lucas in the IBM Technical Disclosure Bulletin, Vol. 13, No. 8, Jan. 1971, page 2382, entitled "Address Chaining Mode In Channel Operations" discloses use of a "spare" bit in an IBM System/360 or 370 Channel Command Word (CCW) as a flag to set up an indirect addressing mode of channel input operation relative to scattered main storage areas of predetermined length. In this mode each data address in the CCW is used to address an entry in a table of addresses which in turn is used as an initial address of a predetermined block of reserved addresses. As the block becomes exhausted the CCW data address is decremented and used to select the next entry in the table as the initial address of another (typically non-contiguous) block and the operation of the current CCW is continued.

There is also extensive literature (publications and patents) dealing with command chaining and data chaining operations in IBM System/360 and 370 channels.

However, to my knowledge there is no capability presently for having a channel transfer plural data blocks of indefinite length into contiguous areas of (main) storage without either extensive and time-costly interaction between the channel and "central" control (or application) programs or modification of peripheral equipment. Such capability in the channel would be desirable inasmuch as it could be used economically and conveniently to reduce fragmentation of main storage due to over-allotment of storage space to such operations. My invention resides in the discovery of need for this specific capability and in the discovery of simple and inexpensive means for adapting channels to provide such capability.

SUMMARY OF THE INVENTION

An object of my invention is to provide for contiguous storage of varied length data blocks by autonomous input operations of an input/output channel; and thereby avoid "wasteful" fragmentation of storage without overburdening central processing control and/or application programs or complicating peripheral attachment.

Another object is to provide for efficient delimitation of boundaries between such contiguous blocks and a related object is to accomplish delimitation without having to interrupt central (CPU) system operations.

These and related objects of the invention are realized by adaptation of an otherwise conventional channel to include an optional chaining operation, herein termed buffer chaining, in its repertoire of chained input operations. In this operation the channel preserves the last updated data address and residual count, after concluding one input operation of a chain, for use as the initial data address and residual count of the next input operation. In a preferred embodiment the channel also stores the preserved data address, in the storage location holding a Channel Command Word (CCW) which designates the next operation; after having retrieved and verified the original information in said word. The stored data address is thereby available to the central system as delimiting information (without CPU interruption) following completion of block transfer; "delimiting" inasmuch as it indicates the initial address in storage of the data block transferred by the subsequent operation.

To determine the length of all but the last data block transferred in this mode the central system (control program) need refer only to initial address information stored in respective and successive CCW's. The length of the last data block may be determined in a number of ways; for instance by subtracting the sum of the final residual count (in the CSW (Channel Status Word)) and the combined lengths of the preceding blocks from the initial count.

Determination of "last-block length" may be simplified by augmenting the channel to include facilities for (a) dynamically developing length counts relative to the individual data blocks in a buffer chained set, and (b) storing such individual counts in the count fields of associated CCW (command) address locations during concluding sequences of respective input operations. This requires an auxiliary (length) counter and may also require the channel to preserve the CCW address in an auxiliary command address register (CA2); the latter register may be the register presently used for command retry (to enable the channel to retry execution of the last initiated command; refer to U.S. Pat. No. 3,688,274 by Cormier et al, entitled "Command Retry Control By Peripheral Devices", issued Aug. 29, 1974).

The foregoing objects and related aspects, features and advantages of the present invention may be appreciated more fully by considering the following detailed description and claims together with the accompanying drawings.

DETAILED DESCRIPTION

The following patents and manuals are incorporated herein as descriptive of machine logic, system and control program environments in which the present invention can be used.

1. "IBM System/360 Principles of Operation", IBM Form No. G22-6821, and "IBM System/370 Principles of Operation", IBM Form No. GA22-7000, provide architectural descriptions of systems in which the subject invention may be embodied.

2. U.S. Pat. Nos. 3,400,371, "Data Processing System", by G. M. Amdahl et al, and 3,626,427, "Large-Scale Data Processing System", by O. L. MacSorley et al, respectively disclose small and large scale data processing systems based upon the above System/360 architecture.

3. U.S. Pat. No. 3,488,633, "Automatic Channel Apparatus", by L. E. King et al, discloses input/output channel apparatus for use in the above data processing systems.

4. A bibliograph of manuals disclosing the above systems and associated operating system programs and attachments is found in "IBM System/360 and System/370 Bibliography", IBM Form No. GA22-6822-21 and Technical Newletter Supplement GN20-0370-2; channel apparatus for these systems is described in Forms Nos. GA33-1516, -1512,-3010, GA24-3573, GA22-6962, -7012, and GA20-1730, -1755.

5. Teleprocessing environments in whih the subject invention may be beneficially employed are described in Forms Nos. GA27-3099, "System Network Architecture — System Summary"and GA24-3909, "IBM Teleprocessing Systems Summary".

6. Published papers providing "environmental" perspectives on Systems Network Architecture and related telecommunication methods are contained in IBM Systems Journal, Vol. 15, No. 1, 1976, pages 2-80.

BASIC CHANNEL/SYSTEM ENVIRONMENT

Figure 1:
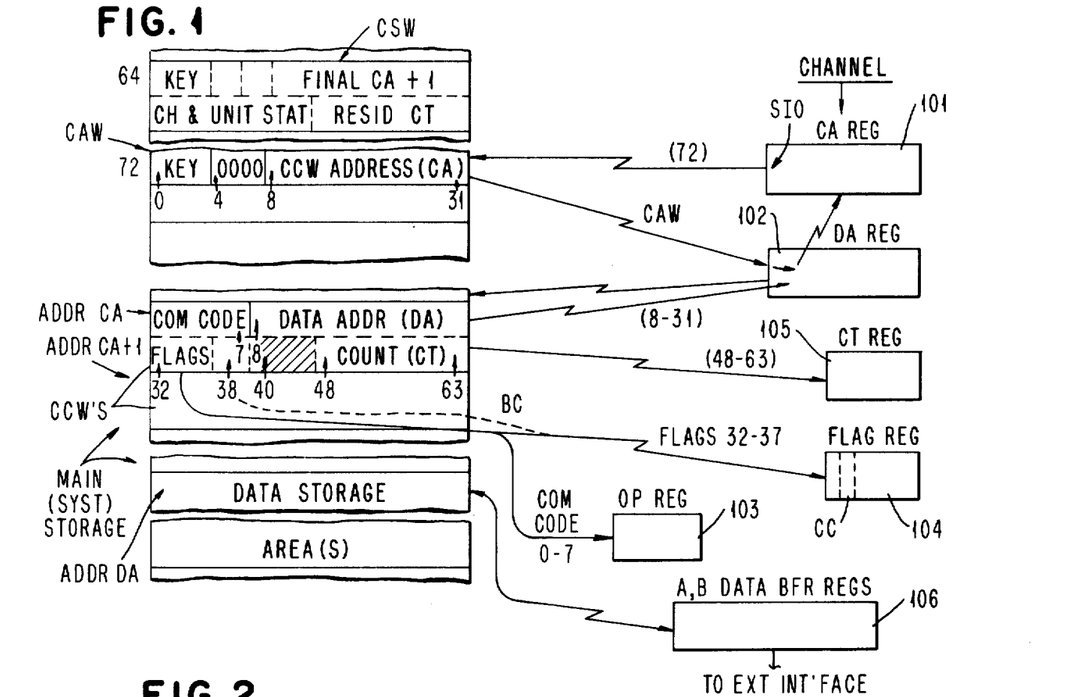
FIG. 1 schematically illustrates the organization and operation of a presently conventional channel of the type disclosed in U.S. Pat. No. 3,488,633 by King et al, entitled "Automatic Channel Apparatus"

Referring to FIG. 1 the channel environment of the invention, which is specifically described in the King et al patent referenced in paragraph No. 3 above, will be briefly reviewed in the environmental context of system architecture and organization described in the references of paragraphs 1 and 2 above.

During execution of a Start I/O instruction, by joint action of the Central Processing Unit (CPU) and channel, the channel issues a storage access fetch request to the central Bus Control Unit (BCU) to retrieve a 32-bit (4 byte) Channel Address Word (CAW) from a predetermined storage location (72) which has previously been loaded by the control programming of the central system. The CAW address is "forced" into the Command Address Register 101 and not-shown SAB (Storage Address Bus) drivers coupled to main/system storage (see FIG. 13A in the referenced King et al Patent). The 24-bit Command Address value in bit positions 8-31 of the fetched CAW is loaded into the channel's Data Address (DA) register 102. Concurrently the channel performs operations relative to its peripheral interface to select and connect up with the peripheral device port (unit address) designated by information in a not-shown Unit Address Register (supplied originally by the Start I/O instruction).

The channel uses command address information of the CAW, in DA Register 102, to retrieve a Channel Command Word (CCW). Another fetch request is issued to the BCU and the command address is passed from register 102 to the SAB drivers. The command address value is also placed in Command Address Register 101. The various portions of the retrieved CCW are transferred from the Storage Data Bus Outlets (SDBO) of the main store to the various associated channel registers.

The 64-bit (8-byte) CCW includes an 8-bit command code portion (bits 0-7), deployed in OP REG 103, which designates the operation to be performed by the channel (e.g. READ for input operation). The CCW also contains a 24-bit data address portion (bits 8-31) routed to DA REG 102, a 6-bit flag portion (bits 32-37) routed to FLAG REG 104 and a 12-bit count (CT) portion (bits 48-63) routed to CT REG 105.

After this initial setup phase of its operation the channel returns a condition code and releases the CPU; effectively terminating the CPU execution of the Start I/O instruction. The channel then acts independently of the CPU to execute the operation specified by the contents of REG 103 relative to the selected port (device) designated by the above-mentioned unit address. In the case of presently relevant READ (input) operations channel data bytes accumulated individually from the designated port, in A and B queueing buffers 106 of the channel, are transferred into main storage in double word (64-bit) units. The main storage addresses for such transfers are designated by the contents of register 102. After each transfer the data address (DA) value in register 102 is updated (e.g. incremented for "normal" READ, or decremented for READ BACKWARDS) and the count in register 105 is decremented to represent a residual count value.

After the last byte of a data block is transferred (device-end) the channel determines whether command chaining is effective by referring to bit CC in FLAG REG 104 (bit 33 of the currently effective CCW). If command chaining is effective (CC=1) the device connection is maintained (or re-established if dropped) and the CA value in register 101 is incremented to designate location of a next (chained) CCW in the main store double word location following the location of the currently effective CCW.

This next CCW is recovered by the channel and if it is not a transfer in channel (TIC) command its parts are routed to register 102-105 as described above and the operation is continued (the data address of a TIC command is used as an "indirect" addressing function, not relevant to the present embodiment of the invention, for selecting a command at a non-sequential address).

When command chaining is no longer effective (bit CC = 0) and device-end is received the channel performs a terminating sequence culminating in I/O interruption of the CPU. The Interruption Handler (IOS) of the central system prepares a Channel Status Word (CSW) for the channel in a specific double word area in storage (address 64) which the latter accesses to store status information (residual count information, a final updated command address and channel and unit status) for subsequent assimilation by central system programming.

BUFFER CHAINING

Figure 2:
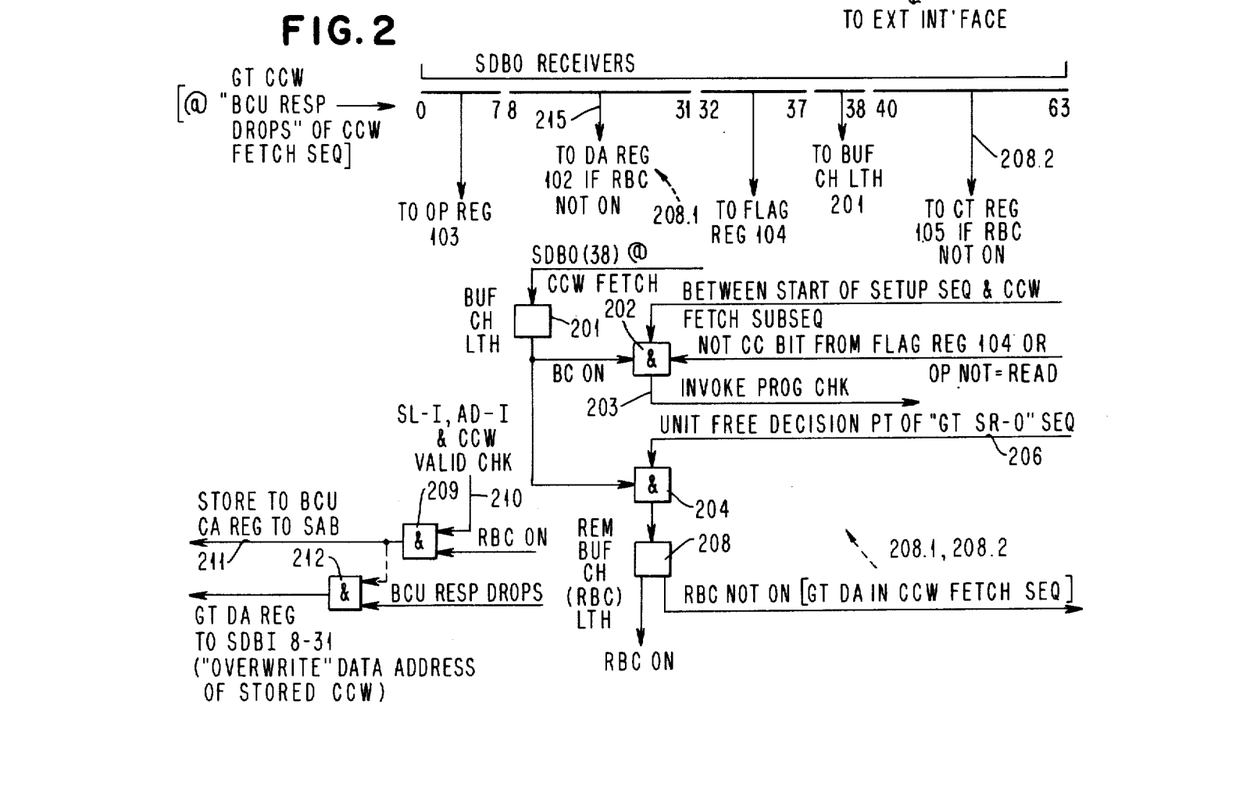
FIG. 2 illustrates implementation of the subject invention as a logical extension of the environmental channel system described in the above-referenced King et al. patent.

Referring to FIG. 2, in accordance with the present invention normally unused bit 38 of the CCW is transferred into auxiliary Buffer Chaining Latch (BUF CH LTH) 201 when the CCW is fetched to the channel. When latch 201 is set to "ON" status (which by convention can occur legitimately only when command chaining and READ operation are also indicated) the present operation of buffer chaining is evoked. The state of latch 201 is "inspected" for validity prior to initiation of CCW fetching. If latch 201 is in ON condition at this point and command chaining is not in effect, or the command operation is other than READ (CC NOT ON or OP NOT = READ), AND circuit 202 produces error indication 203 evoking a program check sequence.

In the preferred embodiment of the invention presently being described with reference to FIG. 2 the condition (of latch 201) is used by the channel logic in the concluding sequence after device-end (refer to the "GT SR - 0" sequence in FIGS. 16S–16Y of the referenced King et al patent) to determine the condition of an associated RBC ("Remember Buffer Chaining") latch. AND circuit 204 (FIG. 2) which is partially enabled at 206 after the unit free decision point of said sequence (reference operation number 839 in FIG. 16V of said King et al patent), is enabled by BC ON to transfer ON status to RBC latch 208. RBC ON partially enables AND circuit 209 whose other input 210 subsequently becomes enabling upon completion of the fetching and validation of the next chained CCW (reference operation 620, FIG. 16D in said King et al patent).

Activation of output 211 of AND 209 evokes a store request to the Bus Control Unit (BCU) initiating a storage access cycle to the address denoted by CA register 101 for overwriting the data address field (bits 8–31) of the stored representation of the currently effective CCW (i.e. the just fetched CCW). In line with this operation, and following sequentially upon acknowledgement from the BCU (BCU RESP DROPS), AND circuit 212 is enabled to issue a gate enabling signal for transferring the current updated DA value in DA register 102 to Storage Data Bus Inlet (SDBI) positions 8–31; thereby overwriting said DA value in the data address storage field of the "current" CCW as delimiting information; without presenting an interruption to the CPU.

NOT RBC (reset condition of latch 208) enables transfer of the DA (data address) and CT (count) portions of the fetched CCW, from SDBO 8–31 and 48–63 to respective registers 102 and 105 (see lines 208.1 and 208.2 FIG. 2). Thus RBC ON disables said transfers and effectively preserves the last updated DA and CT values in these registers for use as initial respective values of a next (buffer chained) block transfer operation and as delimiting information (DA only).

Figure 3:
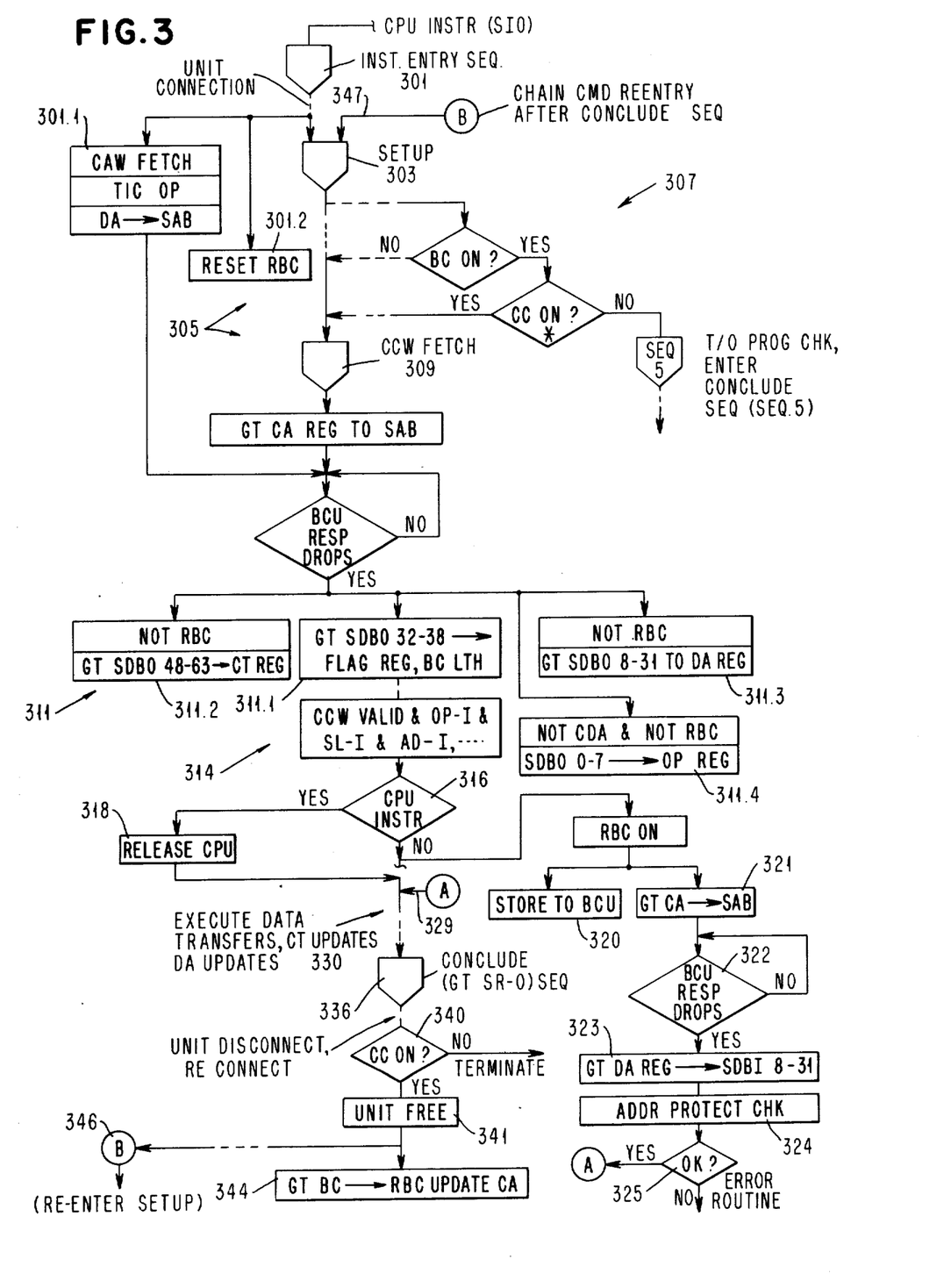
FIG. 3 illustrates the sequence of operations of FIG. 1 including the buffer chaining operation of the auxiliary logic shown in FIG. 2.

FIG. 3 represents a condensation of the full sequence of channel operations (FIGS. 16A through 16Y of the King et al patent) illustrating presently relevant address and residual count preservation and delimiting operations. During execution of the Start I/O (SIO) instruction the CPU passes signals to the channel evoking initial channel sequence 301 (detailed in FIGS. 16A, 16B and 16B1 of the King et al patent). This leads to channel operations 301.1 for CAW retrieval, operation 301.2 turning RBC OFF and unit selection operations (not shown). The sequence also continues into entry 303 to the channel setup sequence 305 (FIG. 16C in the King et al patent).

Operation 307 interposed in this sequence tests the validity of the condition of buffer chaining latch 201. If said latch is in ON state and command chaining is ineffective (CC NOT ON) or a command operation other than READ is indicated (implied by the asterisk in the CC ON test) a program check sequence is invoked. If buffer chaining is OFF or command chaining is ON the CCW fetch sequence 309 is entered. The CA value is passed to SAB with a fetch request to the BCU.

At 311 (BCU RESP DROPS) the fetched CCW becomes available at the storage outlets (SDBO 0–63) 2), its various parts are transferred selectively to associated channel registers. At 311.1 the "ordinary" flag information (bits 32–37) and the buffer chaining flat bit (bit 38) in the CCW are passed unconditionally to respective register 104 and BC latch 201. At 311.2 the count information in the CCW (bits 48–63) is passed conditionally to CT REG 105 if buffer chaining is not currently in effect (RBC NOT ON). At 311.3 the data address information (bits 8–31) is passed conditionally to DA register 102 if buffer chaining is ineffective (RBC NOT ON). IF RBC is ON the foregoing address and count transfers are suppressed and current values in respective registers 102 and 105 (updated values produced at conclusion of a preceding operation) are preserved as respective initial values of the forthcoming data transfer operation. At 311.4 the command portion (bits 0–7) is passed to OP register 103 if RBC NOT ON and data chaining is inactive. Data Chaining is a mode of operation not relevant to the present discussion in which an unterminated operation is continued after exhaustion of one unfragmented storage space (Residual Count becomes zero) with a new CCW designating another storage space. In data chaining, device status and linkage remain unchanged; the new CCW providing only a new initial data address and count.

After verifying validity of the just fetched CCW at 314 the channel performs "CPU instruction" test 316 to distinguish between retrieval of an initial (or "only") CCW after CPU execution of Start I/O and subsequent retrievals of chained commands. A yes decision at this point evokes a release signal to the CPU at 318 which effectively terminates the CPU execution of SIO.

If buffer chaining is effective (RBC ON) following a NO exit from test 316 a storage cycle request is issued at 320 and the CA value in register 101 (i.e. the address of the just fetched CAW) is applied to the storage address bus SAB. When BCU RESP DROPS at 322 indicating storage accessibility the DA value in register 102 (i.e. the saved updated data address) is gated to SDBI positions 8–31 at 323 and thereby overwritten as delimiting information into the DA field of the stored representation of the just fetched and validated CCW. At 324 an address protection check determines sequence branch 325. If an address protection exception is encountered an error routine (program check) is evoked and the operation is terminated.

If a yes decision is made at 325 the "normal" transfer operation continues at 329 (via "circle A" linkage) with sequences 330 for effectuating unit-length data transfers and increment/decrement updates of associated data address and count factors in registers 102 and 105 (for READ/input transfer operations see FIGS. 17 and 17A–17F in the King et al patent).

At the end of an input operation (Device-End received) the channel begins concluding sequences at 336 (see King et al patent, FIGS. 16S, 16T, 16U, 16V . . . ). If command chaining is effective (CC ON) at test point 340 the device linkup is re-established (if terminated) and when complete at 341 (after receipt of UNIT FREE indication) operations 344 transfer the state of BC latch 201 to RBC latch 208 and update the command address CA in register 101. After being turned ON RBC remains ON until buffer chained operation concludes. Meanwhile, the setup and CCW fetch sequences (303, 309) are re-entered via 346 ("circle B") and "line" 347. The function of the RBC latch is to indicate buffer chaining mode for duration of the buffer chained series of operations.

EXAMPLES OF APPLICATION

Figure 4:
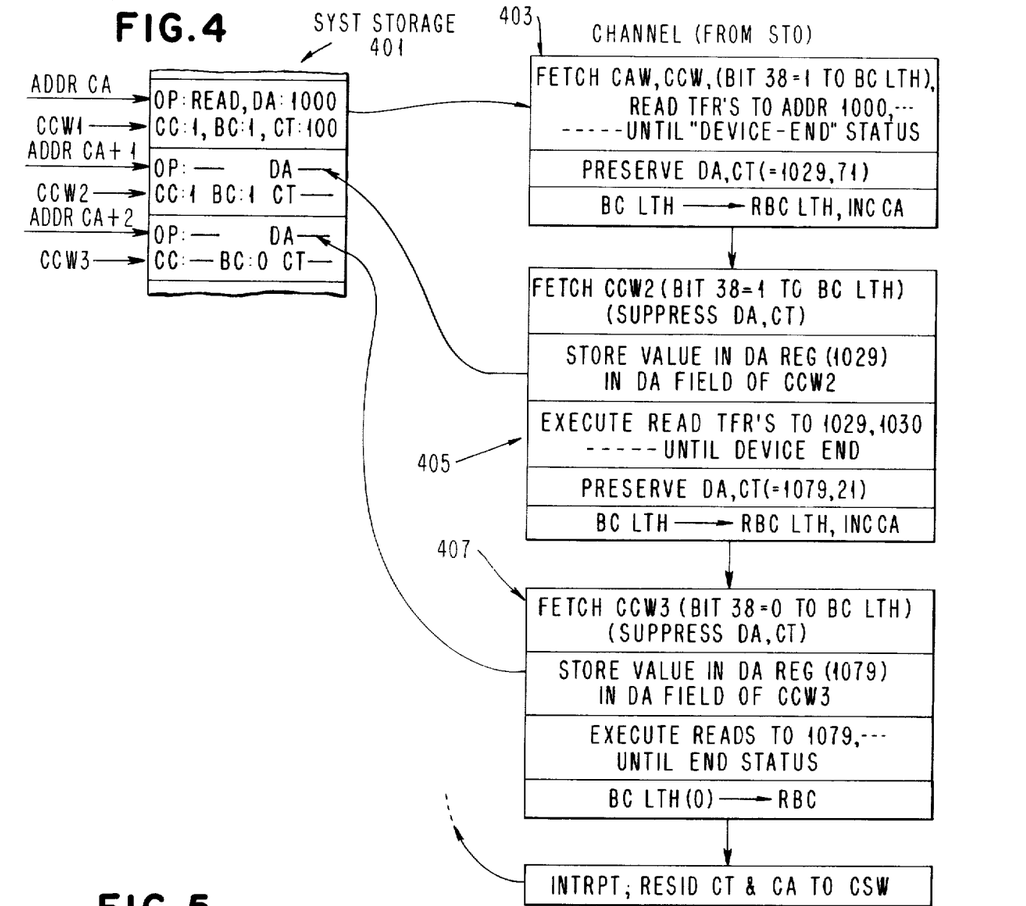
FIG. 4 illustrates operation of the invention in an exemplary teleprocessing transaction wherein three data blocks (messages) from a common origin unit (peripheral device access port) are transferred in buffer chaining mode into contiguous areas of main storage and delimited by (non-CPU interrupting) operation of the invention; enabling the central system to process the three separately.

Application of foregoing operations in buffer chaining mode is illustrated by a simple example in FIG. 4. An exemplary channel program consists of three buffer chained CCW's, located in system (main) storage 401 at addresses CA, CA plus 1, and CA plus 2. These command words designate three sequential READ/input operations of indefinite length (typically three sequential teleprocessing message transfers) from a common origin "peripheral" unit to an unfragmented data storage area of 100 bytes (CT = 100) having an initial data address 1000.

Operation 403 illustrates the effect of channel execution of the first CCW (CCW1) initiated by joint CPU/channel execution of SIO. Address CA of CCW1, determined by the CAW fetch operation, is used by the channel to fetch CCW1 and thereby retrieve initial DA and CT values of 1000 and 100 respectively. After validating CCW1 and releasing the CPU (concluding CPU execution of SIO) the channel executes input data transfers to storage addresses 1000, 1001, 1002, . . . ; intermediately updating its data address and residual count values between consecutive data transfers. This continues until external concluding indication (deviceend) is received, or until error occurs requiring premature termination. This example arbitrarily assumes receipt of device-end after 29 byte transfers. Thus the final updated value in DA REG 102 would be 1029 and the final updated residual count in CT REG 105 would be 71.

Since buffer chaining is effective (BC ON) RBC latch 208 is turned ON. The command address is updated (CA = CA + 1). Since command chaining is effective the next CCW (CCW2) is fetched from the location designated by the updated command address, initiating operation 405. Since RBC is ON only Flag bits 32–37 of CCW2 are transferred to respective channel registers 103 and BC latch 201 and contents of other registers 102, 103 and 105 are preserved. Since bit 38 of CCW2 is the same as bit 38 of CCW1 (both 1) BC latch 201 remains ON. Since bit 33 of CCW2 is 1 command chaining remains effective.

Since RBC is ON the data address value (1029) presently contained in register 102, which represents the updated value following the last data transfer of the concluded operation, is preserved as an initial value of the next operation by the suppression of the transfer of the DA part of CCW2. This value is also overwritten as delimiting information into bit positions 8–31 of address CA plus 1 (i.e. into the DA field of the stored "copy" of CCW2) without CPU interruption or participation.

In the execution of CCW2 the channel continues to transfer data into storage addresses 1029, 1030, . . . until device-end status is received. The illustrated example assumes arbitrarily that 50 bytes are transferred by CCW2 so that the associated final updated value in DA register 102 would become 1079 and the final updated value in CT register 105 would become 21. In the concluding sequence of operation of CCW2 the command address is incremented (CA = CA + 1) and the present (ON) state of BC latch 201 is transferred into the (presently ON) RBC latch 208.

Since command chaining is still effective the channel proceeds at 407 to fetch a third (in the present example, last) CCW, CCW3. In this CCW bit 38, the buffer chaining flag, has a 0 value which will turn BC OFF and thereby terminate the buffer chaining operation after the forthcoming operation is concluded. Since RBC is still ON only the flag information of CCW 3 is transferred. The transferred command chaining bit 33 may be either 1 or 0. As will be explained later in reference to FIG. 6 command chaining may be continued after termination of buffer chaining.

Since buffer chaining is still effective in operation 407 the value (1079) in data address register 102 is overwritten, into the data address field (bit positions 8–31) of CCW 3 at the updated command address storage position, as delimiting information. Now the channel proceeds to execute READ transfers to addresses 1079, 1080, . . . until device-end status is again received. In the example of operation 407 end status is assumed to be received after 15 bytes so that the final updated data address value would be 1094 and the final updated residual count would be 6. The command address is incremented and the OFF state of the BC latch is transferred to the RBC latch turning the latter OFF. Assuming for simplicity that no further commands are to be executed (CC OFF) the current operation and chaining sequence would be terminated and the channel would proceed, in the normal terminating sequence described in said King et al patent, to load concluding status into the CCW (Channel Status Word) at the predetermined address (address 64 of main storage). The concluding status information includes the final residual count (e.g. 6). The use of CSW location 64 is coordinated by interruption of and acknowledgement by the CPU so that use by plural channels is suitably ordered.

The delimiting information overwritten into the data address fields of CCW2 and CCW3 and the original initial data address information retained by CCW1 indicate initial address locations of the three contiguously located message blocks transferred by the operations designated by said CCW's. Although the manner in which the central system uses this information is not directly relevant to the present invention, FIG. 5 indicates an exemplary procedure which could be employed for determining block lengths. The address (1000) in CCW1 could be subtracted from the initial delimiting address (1029) in CCW2 yielding a remainder 29 corresponding to the length of the first data block transferred by operation of CCW1 and thereby order the recovery of said first data block. The initial delimiting address (1029) in CCW2 could be subtracted from the initial delimiting address (1079) in CCW3 yielding the remainder 50 indicating the length of the data block transferred by CCW2.

Figure 5:
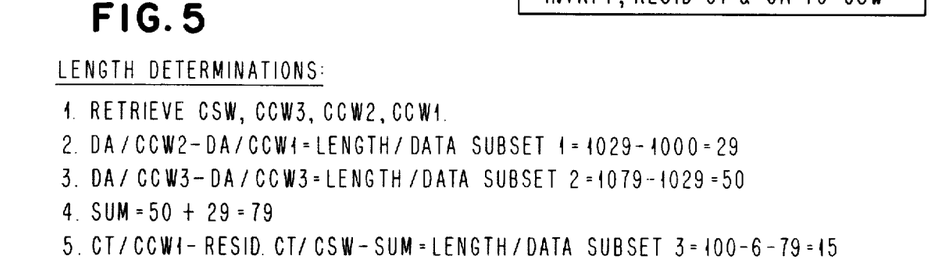
FIG. 5 illustrates exemplary operations to determine block lengths within data contiguously stored by the operations of FIG. 4.

The length of the last (third) data block transferred by CCW3 could be determined, for instance, by: (1) obtaining the sum (i.e. 79) of the lengths of the preceding data blocks; (2) obtaining the difference (i.e. 94) between the initial count in CCW1 (i.e. 100) and the residual count stored in the CSW (i.e. 6); and (3) subtracting said sum from said difference to yield result 15 which correctly represents the length of the last data block.

The block lengths could be more conveniently determined if the channel operation could be adapted to store block lengths while executing respective buffer chained transfers. A second embodiment shown in FIG. 7 indicates such adaptation at slightly increased expense. Such length delimitation does not render the foregoing address delimitation useless since the address information also facilitates location/retrieval of said data blocks.

Figure 7:
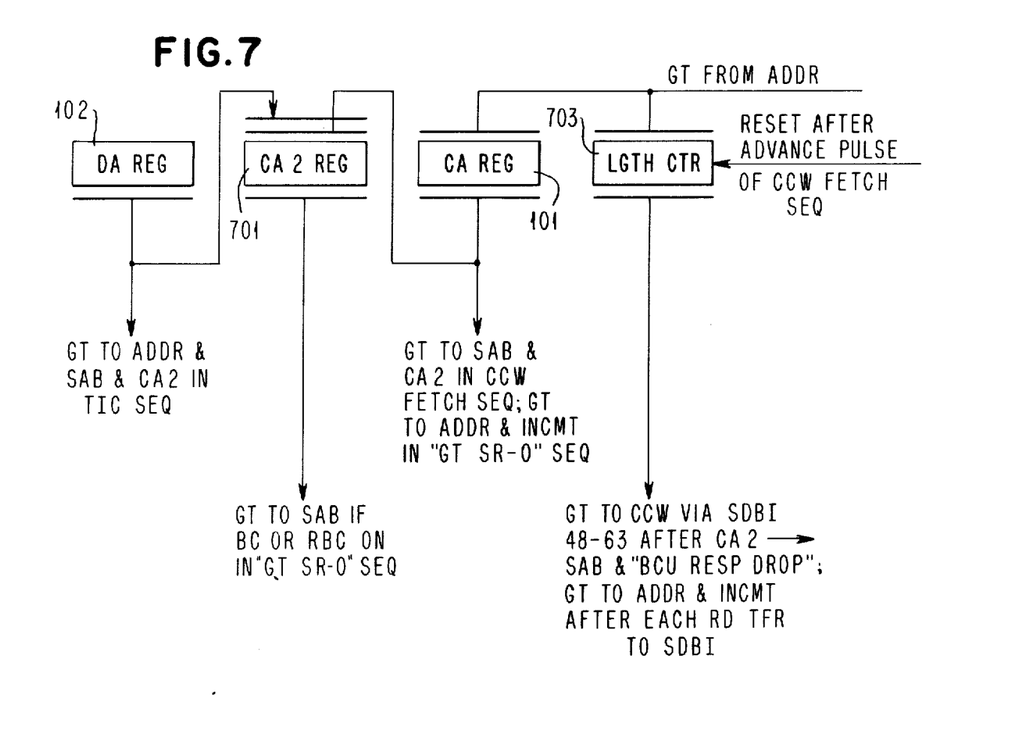
FIG. 7 illustrates channel logic for delimiting lengths of data blocks transferred by buffer chaining, as either a supplement or substitute for the data address delimitation characterized in FIGS. 2 and 3.

As indicated in FIG. 7, existing registers of the channel are augmented by a backup command address register 701 (CA2 REG) and length counter 703. These respectively enable the channel to preserve the address (CA) of the currently effective CAW after said address has been updated (in the concluding sequence) and to develop separate length counts for the individual data block transfers in a buffer chained series. These two registers are used in the concluding sequence of each operation of a buffer chained series to store information delimiting block length at the storage position of the respective CCW. The CA2 register is not required if the sequence stage of command address updating is advanced to "CCW fetch" stage.

The CA2 register is loaded with command address information; either the "data" address in the CAW (during fetching of the initial CCW of a buffer chain) or the updated value returned to CA REG 100 (in the updating sub-operation of the concluding sequence following deviceend). Counter 703 is reset during CCW fetching and thereafter incremented after each "unit-length" transfer of input data to main storage. Hence the final value in register 703 when device-end is received represents the length of the data block transferred by the currently effective CCW.

In the concluding sequence of each block transfer in buffer chained mode the value in CA2 register 701 is passed to the storage address bus SAB in coordination with a storage cycle request to the BCU. At the appropriate subsequent phase of storage operation (BCU RESP DROPS), the information in length counter 703 is gated to SDBI positions 48–63 and thereby overwritten into the count field of the currently effective CCW as a length delimiting indication.

Figure 6:
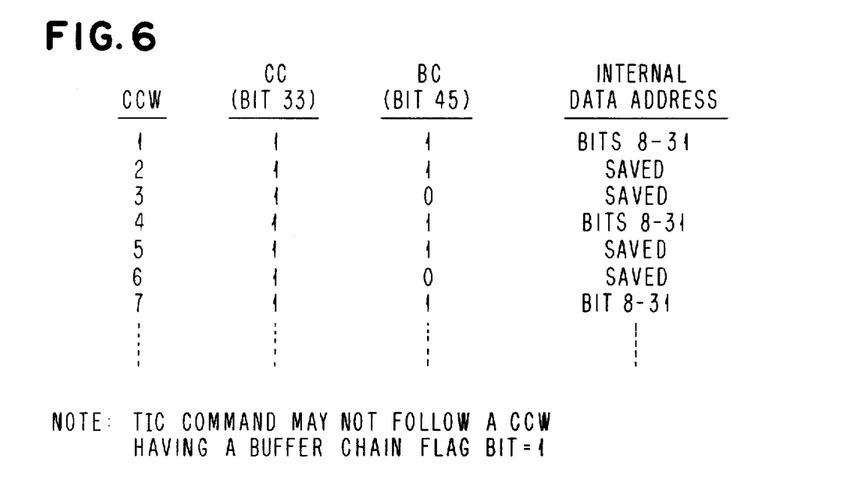
FIG. 6 illustrates "grouped" buffer chaining within sets of CCW's linked for command chaining.

Referring to FIG. 6 it is seen that command chaining may continue after buffer chaining terminates. The first three CCW's are buffer chained as a group and so are the next three. However, the third and fourth CCW's are only command chained together and not buffer chained together. RBC would be turned OFF by the concluding operation of the third CCW. Therefore execution of the fourth CCW would begin at the (non-contiguous) address specified in said CCW.

DISCUSSION

A. Channel Programming Restrictions

The foregoing buffer chaining technique pertains to any data processing system having input-output facilities capable of executing data block input transfers in chained mode. In certain systems of this type — typically IBM System/360 and 370 systems — the input-output facilities (channels) are responsive to Transfer-In-Channel commands in a command chain to fetch the next CCW of the chain from a "non-consecutive" command address designated in the data address field of the TIC CCW; said non-consecutive address being deployed in the Data Address register of the channel (e.g. register 102). However buffer chaining as presently contemplated requires preservation of the updated final data address so that it may be used subsequently as the initial address of the next input operation. Consequently a programming restriction imposed presently on the formation of buffer chaining links in command chains is that the commands so linked must not include a TIC command.

Although it would not be especially difficult, in a technical sense, to provide an auxiliary register for preserving the final updated data address value during TIC execution, or to modify TIC fetching to "detour" the data address field of the TIC command to the auxiliary command address register CA2 mentioned above, this would considerably complicate and increase the expense of buffer chained operations and is not viewed as especially desirable.

B. Residual Count Depletion (Exhaustion of Allotted Space)

Ordinarily the residual count is tested after each decrement (i.e. after each transfer of unit-length data to storage). If the decremented residual count reaches zero before completion of all transfers in a buffer chained series a storage over-run sequence is evoked. The operation is terminated, space is reallocated by central programs and the operation is restarted and retried. It is contemplated that in the majority of instances of buffer chained operation such overflow will not occur, and when it does only the operation interrupted by the depletion of the count will require retry after restarting.

C. Data Chaining Option In Buffer Chaining

As mentioned previously data chaining (1 in CCW flag bit position 32) is used ordinarily by the channel (in non-buffer-chained mode) to continue an unterminated operation when storage space allocated for the operation becomes exhausted (residual count becomes zero) before device-end. In accordance with the present invention data chaining and buffer chaining flags in a CCW may be used co-effectively to cause the channel to respond to "non-concluding" tag indications presented at the device/peripheral interface to distinguish "sub-block" boundaries within an otherwise continuous data block. At each such sub-block indication the channel could fetch a successive CCW, overwrite delimiting information in a stored CCW and continue input operation. In this mode zero residual count would be treated as an "ordinary over-run" in non-data-chained mode. Thus, an "intelligent" peripheral control unit could effectively combine a series of separately originated sub-blocks into one block and utilize the non-concluding signals mentioned above, to effectuate "on the fly" buffer chaining and delimiting operations relative to the sub-blocks. Thus, for instance, a series of separate teleprocessing communications scheduled for separate processing could be handled effectively as one "continuous" input transaction (input operation) with intermediate delimitation by foregoing sub-block chaining in data/buffer chained mode.

D. Buffer Chain Creation

CCW's linked by command chaining flags into a channel program may be further linked for buffer chaining by insertion of buffer chaining flags (in bits 38) prior to initiation of the associated channel operation. The central system program may allocate an unscattered storage space to any number of consecutive commands in a command chained series (see FIG. 6). This can be particularly effective if the allocating program has "educated guess" information enabling it to estimate fairly accurately the aggregate data transfer load anticipated for a given series of CCW operations.

Thus, for instance, if an available unscattered space would be expected to be almost filled (but not to overflowing) with the anticipated input of four consecutive CCW READ commands in a command chained series, the allocating program could insert buffer chain flags in the first three of these CCW3 s, and appropriate data address and count values in the first CCW, to effect efficient buffer chained usage of said space.

While the invention has been particularly shown and described with reference to preferred embodiments thereof, it will be understood by those skilled in the art that various changes in form and detail may be made therein without departing from the spirit and scope of the invention.

What is claimed is:

1. A method of transferring plural data blocks of unspecified length, supplied consecutively at an input-output interface, into storage facilities accessible to central processing facilities of a data processing system, comprising:
    transferring one said data block into a series of successive address locations of said storage facility, starting at a pre-designated initial address and concluding at a final address associated with receipt of a concluding indication at said interface; and without interruption,
    conditionally transferring a successive data block into another series of addresses in said storage facility starting at an initial address determined by applying a predetermined mathematical increment to a representation of said final address.

2. A method of performing input data transfers in accordance with claim 1, including:
    storing a representation of said initial address of said successive block in a location of said storage facilities pre-associated with the operation of transfering said successive block.

3. A method in accordance with claim 1, in a system in which a series of residual count values are produced in association with said series of addresses, said count values designating an amount of space remaining available in said storage for receiving said data blocks out of a larger space initially allotted for said transfers, said method including:
    producing an initial residual count value associated with said initial address of said successive block; and
    continuing said production of residual count values, during the transfer of said successive block, utilizing said initial residual count value as an initial value in said continuing production.

4. A method in accordance with claim 1, including:
    producing length counts designating lengths of respective said data blocks during respective said transferring steps of operation; and
    conditionally storing said length counts in storage address locations pre-associated with respective transferring steps of operation.

5. A method in accordance with claim 4, in a system in which said transferring steps of operation are designated by control words (CCW's) available at predetermined command address locations of said storage facilities, said method including:
    storing said length counts at command address locations containing the control words designating respective transferrng steps of operation in which respective data blocks are transferred.

6. In a data processing system having a channel facility capable of conducting an input transfer operation to transfer unit-length portions of an externally originated data block of unspecified length into successive unit-length address locations of a program store, starting at a predetermined initial address location and concluding at a final address location determined after receipt of a concluding indication from an external source of said data block, said channel having a chaining mode of operation by which plural said input operations may be conducted successively without communication between said channel and other facilities served by said store, the channel improvement comprising:
    means for conditioning said channel for chaining operation in a buffer chained mode; and
    means responsive to said channel being conditioned for operation in said buffer chained mode, after conclusion of one said input transfer operation, for initiating a successive input transfer operation relative to an initial address in said store determined by applying a predetermined mathematical increment to the final address associated with said one operation.

7. The channel improvement of claim 6, in a system in which said channel maintains a residual count while conducting said input transfer operation, said residual count designating residual space remaining in said store for receiving input data currently being transferred out of an original space pre-allotted for a said block transfer, wherein:
    said means for initiating said successive input operation in buffer chained mode is effective to cause said channel to produce an initial residual count for said successive operation by applying a predetermined negative increment to the final residual count of said one operation, said negative increment bearing a predetermined relation to the increment applied to the final address of said one input operation.

8. The channel improvement of claim 7, including:
    means associated with said means for initiating said successive operation for conditioning said channel in buffer chained mode to store delimiting information at an address location in said store pre-asssociated with one of said one and successive input operations, said delimiting information distinguishing the relative positions in said store of the end of the data block transferred by said one operation and the beginning of the data block transferred by said successive operation.

9. The channel improvement according to claim 8, in a system in which said one and successive operations are designated by respective control words (CCW's) pre-stored at predetermined command address locations in said store prior to execution of respective operations, wherein:
    said associated means for conditioning said channel to store delimiting information includes means for conditioning said channel to store said delimiting information in a said command address location providing a control word designating one of said one and successive operations.

10. The channel improvement according to claim 8 wherein said delimiting information comprises a representation of the initial address of said successive operation and is stored in association with said successive operation.

11. The channel improvement according to claim 8 wherein said delimiting information comprises a representation of a count representing the length of the data block transferred by said one operation and is stored in association with said one operation.

12. The improvement of claim 7, in a channel facility which includes data address and residual count registers and increment applying logic cooperative with said registers to produce said successive unit-length addresses and respectively associated residual counts, including:

means effective at the conclusion of the transfer of said one data block, after applications of respective increments to the final address and residual count of said one operation, for preserving the values in said registers resulting from said increment applications as the respective initial address and residual count of said successive operation.

13. The channel improvement of claim 12, including: means associated with said channel conditioning means for causing said channel to store said preserved initial address as delimiting information in an address location of said store pre-associated with said successive operation.

14. The channel improvement of claim 13, in a system in which said one and successive operations are designated by respective control words (CCW's) pre-stored at respective predetermined command address locations in said store prior to execution of respective operations, wherein:

said means for causing said channel to store said delimiting information causes said channel to store said preserved initial address in the command address location of the control word designating the successive operation.

15. The channel improvement of claim 12, including: means for counting the number of unit-length portions of data transferred to said store in a said input operation; and means operative after receipt of said concluding indication in said one operation for storing an associated final value of said number count in an address location in said store pre-associated with said one operation.

16. The improvement of claim 12 wherein said means for conditioning said channel for operation in buffer chained mode comprises:

a set-reset latch (RBC) conditioned selectively to set state at the conclusion of said one operation and retaining set conditioning during execution of said successive operation; and said preserving means comprises:

logical gating circuits enabled by reset conditioning of said latch for ordinarily transferring initial data address and count information from said store to respective said address and residual count information registers upon initiation of a successive chained operation.

17. The channel improvement of claim 15, in which said channel includes a command address register, for holding the address of a currently effective said control word, said command address register being cooperative with said increment applying means for incrementing command address values held in said register, the value in said register after conclusion of a said operation in chaining mode designating a successive command address for recovering a successive control word designating a successive chained operation; wherein said means for storing said number count value comprises:

an auxiliary command address register for preserving the address of a currently effective command between the conclusion of said one operation and the initiation of said successive operation; and means coupled to said auxiliary register for addressing said store for storage of said final value of said number count in the address location containing the control word associated with said one operation.

18. In a data processing system including central (CPU) and I/O channel processing units and program storage accessible to both said units, wherein said channel is capable of operating in command chained mode, in response to input commands available in predetermined command address locations in said storage, to transfer plural data blocks of unspecified length from an external source to preallotted data address spaces in said storage without having to interrupt said CPU, means for causing said channel to operate conditionally in command chained mode to locate successively received said data blocks contiguously in said storage comprising:

means selectable for conditioning said channel in command chaining mode to perform an address linking operation relative to said storage; and means responsive to said linking means, between the conclusion of the transfer of one said data block and the initial transfer of a successive block, for producing an initial address for the transfer of said successive block, said initial address designating a location in said storage contiguous to the location of the last transferred data element of said one block.

19. Means in accordance with claim 18, for causing a channel to operate to link addresses contiguously between chained input operations, including:

means responsive to said linking means for causing said channel to store a representation of said initial address at a predetermined location in said storage associated with a command designating the transfer of said successive block.

20. Means for operating a channel in accordance with claim 19 wherein said initial address is overwritten in a data address field of said command designating said transfer of said successive block.

21. Means in accordance with claim 18, including: means associated with said selectable conditioning means for producing a length count denoting the length of said one data block at the conclusion of the transfer of said one block; and means for causing said channel to store a representation of said length count at a predetermined location in said storage associated with the operation of transferring said one block.

22. Means in accordance with claim 21, including: means for causing said channel to store a representation of said initial address of said successive block at a predetermined location in said storage associated with the operation of transferring said successive block.

23. A method of conducting input channeling operations, for transferring externally originated data blocks of unspecified length into a centrally accessible program storage of a data processing system, comprising:

allocating a range of addresses denoting an unscattered space in said storage for receiving an estimated aggregate length of data to be transferred by means of plural consecutive said input channeling operations; and conducting said plural input channeling operations consecutively in an address linking mode by which the address assigned as an initial data receiving address for a said input channeling operation other than the first of said plural operations is determined by applying a predetermined mathematical increment to a representation of the address assigned as a final data receiving address in a respectively preceding one of said plural operations.

24. The method of claim 23, including:

storing delimiting information in said storage, in predetermined positional association with respective said input channeling operations, whereby said transferred data block may be separately retrieved and processed.

* * * * *